ABSTRACT

United States Patent [19]

Riener

[11] 4,207,398
[45] Jun. 10, 1980

[54] PROCESS FOR PREPARING PHYSICALLY STABLE QUATERNARY AMMONIUM ANION EXCHANGE RESINS BY CHLOROMETHYLATION AND AMINATION IN THE ABSENCE OF ADDITIONAL ORGANIC SOLVENT

[75] Inventor: Edward F. Riener, Cinnaminson, N.J.

[73] Assignee: Rohm and Haas Company, Philadelphia, Pa.

[21] Appl. No.: 946,295

[22] Filed: Sep. 27, 1978

Related U.S. Application Data

[63] Continuation-in-part of Ser. No. 877,933, Feb. 15, 1978, abandoned, which is a continuation of Ser. No. 702,319, Jul. 2, 1976, abandoned.

[51] Int. Cl.$^2$ .......................... C08F 8/24; B01D 15/04
[52] U.S. Cl. ......................................... 521/31; 521/32; 525/359
[58] Field of Search ..................... 521/31, 32; 526/46

[56] References Cited

U.S. PATENT DOCUMENTS

| | | | |
|---|---|---|---|
| 3,311,602 | 3/1967 | Raley, Jr. ............................... | 526/46 |
| 3,549,562 | 12/1970 | Mindick et al. ........................ | 521/32 |
| 3,817,878 | 6/1974 | Clemens et al. ....................... | 521/32 |

FOREIGN PATENT DOCUMENTS

| | | | |
|---|---|---|---|
| 50-49783 | 5/1974 | Japan ........................................ | 521/31 |
| 1055188 | 1/1967 | United Kingdom ...................... | 521/31 |

*Primary Examiner*—Joseph L. Schofer
*Assistant Examiner*—Peter F. Kulkosky
*Attorney, Agent, or Firm*—Lester E. Johnson; Jordon J. Driks

[57] ABSTRACT

Crosslinked quaternary ammonium anion exchange resins having a copolymer backbone containing a major amount of units derived from at least one non-polar aromatic monovinyl monomer and a minor amount of units derived from at least one polar functionally substituted comonomer, and characterized by improved physical stability, are prepared by an improved process, wherein the improvement comprises haloalkylating the aromatic nuclei of the copolymer backbone and aminolyzing the intermediate copolymer in the absence of added organic solvent.

9 Claims, No Drawings

PROCESS FOR PREPARING PHYSICALLY STABLE QUATERNARY AMMONIUM ANION EXCHANGE RESINS BY CHLOROMETHYLATION AND AMINATION IN THE ABSENCE OF ADDITIONAL ORGANIC SOLVENT

This is a continuation-in-part of U.S. Ser. No. 877,933 now abandoned filed Feb. 15, 1978, which is in turn a continuation of U.S. Ser. No. 702,319 filed July 2, 1976, now abandoned.

This invention relates to an improved process for preparing crosslinked, physically stable, quaternary ammonium anion exchange resins and to the resins prepared thereby. The resins have a backbone of a major amount of at least one non-polar, aromatic monovinyl hydrocarbon monomer and a minor amount of at least one incompatible, polar functionally-substituted comonomer selected from the group consisting of suitably substituted polyethylenically and monoethylenically unsaturated monomers wherein, if only one comonomer is used, said comonomer is polyethylenically unsaturated.

Quaternary ammonium (strong base) anion exchange resins containing a major amount of aromatic vinyl hydrocarbon and a minor amount of polyethylenically unsaturated crosslinking constituent of the aromatic polyvinyl hydrocarbon or polyfunctional unsaturated carboxylic acid types are known in the art to be produced according to processes wherein the comonomers are emulsion- or suspension-polymerized and the copolymers are haloalkylated and subsequently aminated with tertiary amines. For further details of typical prior art processes, see U.S. Pat. Nos. 3,843,566; 3,817,878; 3,549,562; 3,637,535; 3,297,648; 2,874,132; German Pat. No. 1,151,127; and Japanese Pat. No. 71,20,054. Typically, the haloalkylation reaction is performed by treating the precursor polymer with the haloalkylating agent in the presence of a Lewis acid catalyst (also known as a Friedel-Crafts catalyst) and in the presence of an organic swelling solvent. Upon quenching this reaction with water and subsequently aminolyzing the intermediate, haloalkylated copolymer, the isolated product resin beads have been found to display satisfactory, though less than most desirable, physical stability. Some improvement is observed in the process, and product thereof, when the haloalkylation reaction is quenched with methanol. However, this methanol quench process involves complex and expensive manufacturing apparatus and minipulation.

Such known processes produce resins which, although satisfactory for many anion exchange utilizations, have been criticized as being physically vulnerable for some ion exchange operations such as, for example, continuous ion exchange processes practiced in condensate polishing.

The longevity or durability of a resin is generally understood to be directly related to such characteristics as physical stability, thermal stability, regeneration efficiency, column capacity, oxidative stability, and organic fouling. The physical stability of a resin is particularly important as a measure of its ability to withstand physical attrition as it is directly correlated with the ability of the resin beads to withstand crumbling when subjected to heavy stresses. Physical stability may conveniently be measured by the "Chatillon Test" which will be explained in more detail hereinafter.

It has unexpectedly been found that the combination of the incorporation of a polar functionally-substituted monoethylenically or polyethylenically unsaturated comonomer in the polymer backbone and the use of haloalkylating agent in quantity in excess of that amount required for the haloalkylation reaction in the absence of added organic solvents not only allows water quenching of this reaction to provide a halo alkylated intermediate copolymer but also provides final product resin beads, prepared by aminating the intermediate copolymer, which are characterized by improved physical stability.

It is an object of this invention to provide in a process for preparing an anion exchange resin comprising the steps of:

(a) preparing a crosslinked copolymer by polymerizing a monomer system comprising (i) from about 85 to 99.95 parts by weight of at least one non-polar, aromatic monovinyl hydrocarbon monomer; (ii) from about 5 to 0.05 parts by weight of at least one polar functionally-substituted comonomer selected from the group consisting of monoethylenically and polyethylenically unsaturated compounds wherein, if only one comonomer is used, said comonomer is polyethylenically unsaturated; and (iii) from about 10 to 0 parts by weight of at least one polyvinyl aromatic hydrocarbon;

(b) haloalkylating said copolymer reagent in the presence of a Lewis acid catalyst wherein the haloalkylating agent is selected from the group consisting of monochloromethyl methyl ether and bis-chloromethyl ether;

(c) quenching the haloalkylation reaction, and washing the haloalkylated intermediate copolymer, with water; and (d) treating said intermediate copolymer in an aqueous slurry with a tertiary amine to give a quaternary ammonium anion exchange resin; the improvement comprises performing steps (b) to (d) in the absence of added organic solvent whereby an anion exchange resin, characterized by improved physical stability, is obtained.

Another object of this invention is to provide improved product resins prepared by the process of this invention.

The copolymers of this invention may be prepared by a variety of known methods. The monomer system may be mixed and then polymerized en masse or it may be emulsified or otherwise suspended in a liquid medium. Emulsion- and suspension-polymerization, in which the monomers are first suspended in a non-solvent for the monomers, such as, for example, water, are preferred because these methods yield spheroids or "beads" (that is, gel resin beads) and the size of such particles can be regulated and controlled. A modification of the suspension-polymerization method can be used to produce porous beads, that is, macroreticular resin beads. This modification involves suspending and polymerizing the monomers in a chemically inert solvent which is immiscible with the suspending liquid and subsequently removing this occluded chemically inert solvent from the beads.

The polymerization reaction may be catalyzed by customary free radical catalysts of the peroxide and azo types. The catalysts are used in usual ranges of 0.01 to 3.0% by weight based on weight of the monomer mixture.

Preferably, non-polar, aromatic monovinyl hydrocarbon monomer is selected from the group consisting of styrene, o-, m-, and p-alkylstyrenes, o-, m-, and p- alkoxystyrenes, and vinyl naphthalene. Styrene is most preferred.

Preferably the polar-functionally substituted comonomer is selected from the group consisting of acrylonitrile, methacrylonitrile, alkyl acrylates, alkyl methacrylates, trimethylol propane trimethacrylate (and triacrylate), and ethylene glycol dimethylacrylate (and diacrylate) wherein, if only one comonomer is used, said comonomer is selected from the group consisting of trimethylol propane trimethacrylate and triacrylate, and ethylene glycol dimethacrylate and diacrylate. When a polar functionally-substituted, monoethylenically unsaturated comonomer is selected, it is used in combination with a crosslinking polyvinyl hydrocarbon selected from the group consisting of divinyl benzene, divinyl alkyl benzenes, divinyl naphthalenes, and trivinyl benzene.

More preferably, the copolymers employed in the process of the invention comprise copolymers polymerized from a monomer system comprising:

(a) from about 90 to 97.5 parts by weight of at least one aromatic, monovinyl hydrocarbon monomer selected from the group consisting of styrene and o-, m-, and p-alkylstyrenes;

(b) from about 2.5 to 0.5 parts by weight of at least one polar functionally-substituted comonomer selected from the group consisting of acrylonitrile, methyl methacrylate, iso-decyl methacrylate, and trimethylol propane trimethylate; and (c) from about 7.5 to 1.8 parts by weight of divinyl benzene.

Specific examples of the preferred copolymers defined above include those copolymers polymerized from the following monomer systems (relative ratio of amounts as nearest whole number ratio):

Styrene/Divinyl Benzene/Acrylonitrile (94-97/4-2/2-1)
Styrene/Divinyl Benzene/Trimethylol Propane Trimethacrylate (97/1/2)
Styrene/Divinyl Benzene/Methyl Acrylate (94/4/2)
Styrene/Divinyl Benzene/Ethylhexyl Acrylate (94/4/2)
Styrene/Divinyl Benzene/Methyl Methacrylate (94/4/2)
Styrene/Divinyl Benzene/Iso-Decyl Methacrylate (94/4/2)

In the above, it is to be understood that commercially available divinylbenzene contains a substantial proportion of the partially saturated impurity, ethyl vinyl benzene (ethyl styrene); the commercial grade of divinyl benzene used in the examples which follow assays for 55% divinyl benzene and 45% ethyl vinyl benzene.

The haloalkylation reaction may be performed by preparing a slurry of the copolymer in excess haloalkylating agent and slowly adding Lewis acid catalyst while maintaining the temperature of the reaction at about 35° C. The resulting reaction mixture is then maintained at about 15°–40° C. to achieve the desired extent of haloalkylation. Finally, the reaction mixture is quenched and washed with water to remove excess reagents and by-products of the reaction and destruction of the reagents.

Preferably, the haloalkylating reagent is selected from the group consisting of chloromethyl methyl ether and bis-chloromethyl ether and is used in sufficient excess to render the mixture fluid, more preferably in a ratio of from about 5 to 7 mols per mol copolymer. Chloromethyl methyl ether is most preferred. For purposes of this specification, the haloalkylating agent is not considered "added organic solvent" since it functions as a reactant.

The haloalkylation reaction is catalyzed by any one of the well-known Lewis acid catalysts (also known as Friedel-Crafts catalysts) such as, for example, $AlCl_3$ and $ZnCl_2$, which catalyst is used, preferably, in a ratio of 0.6 to 0.85 mol per mol of copolymer.

The aminolysis reaction may be performed by slowly adding to an aqueous suspension of the haloalkylated intermediate copolymer a tertiary amine. Upon completion of the amine addition, the reaction mixture is stirred until nitrogen incorporation into the copolymer is complete. Then, the mixture is heated to distill off residual amine, cooled and washed with water.

A suitable tertiary amine is one selected from the group consisting of trimethyl amine, triethyl and tripropyl amines, dimethyl ethyl amine, diethyl cyclohexyl amine, tricyclohexyl amine, triphenyl amine, diphenyl ethyl amine, benzyl dimethyl amine, benzyl phenyl methyl amine, dimethylaminoethanol, and the like, and is used in a ratio of about 1.6–2.3 mols of amine per mole of copolymer. Trimethylamine is more preferred.

The following examples are presented to illustrate the advantages, particularly the synergistic effect, of the process and product of this invention with respect to prior processes and products. All parts and percentages are by weight unless otherwise indicated.

EXAMPLE 1

An improved quaternary ammonium anion exchange resin, according to this invention, is prepared as follows:

(a) A styrene-divinyl benzene-acrylonitrile terpolymer, wherein the respective constituent monomers are mixed in the ratio 96.9:2.1:1, is prepared according to known suspension polymerization techniques.

(b) 106 parts of the copolymer (or, more explicitly, the terpolymer) of (a) is slurried in 500.6 parts of chloromethyl methyl ether (CME) in a suitable flask. In a separate flask, 80 parts aluminum chloride ($AlCl_3$) is slowly added, with stirring and external cooling so as to maintain a temperature of less than 25° C., to 63.7 parts CME. When dissolution of $AlCl_3$ is complete, the resultant solution is added dropwise to the copolymer slurry over a 4-hour period wqhile maintaining the temperature in the range 35°–40° C. Upon completion of this addition, the chloromethylation reaction mixture is "held," i.e. stirred, for a further 4-hour period at 35°–40° C. Then, this reaction mixture is slowly poured into about 750 parts tap water, with stirring, while maintaining the temperature at 5°–10° C., and the resulting slurry is stirred for about 0.5 hour. Then, the beads are allowed to settle and the supernatant aqueous phase is siphoned off. These beads are washed by adding 586.4 parts tap water to the beads, stirring the mixture for about 0.5 hour, allowing the beads to settle, and then siphoning off the supernatant aqueous phase. Another 586.4 parts of tap water is added to the beads, the mixture stirred, and the bead slurry neutralized by adding 50% NaOH. When the pH of this slurry is about 8.0, a further 303.8 parts tap water is added, and the resulting slurry is cooled to 0°–5° C.

(c) Quaternary ammonium anion exchange resin beads are prepared by adding 80.4 parts of anhydrous trimethylamine (TMA) to the cooled intermediate copolymer slurry from (b) over a 1.5-hour period. Upon completion of the addition of TMA, the stirred reaction mixture is heated over a 3.5-hour period to distillation conditions while adding tap water slowly so as to maintain the bead mixture as a slurry. Then, the reaction mixture is cooled to 60° C. and the aqueous phase is siphoned off. The resin beads are collected on a filter pad and washed with three 1-liter portions of water. The product resin beads give the following analyses:

| Analytical Properties | |
|---|---|
| Moisture Holding Capacity, % | 68.5 |
| Weight Capacity, meq/gm | 4.3 |
| Whole Beads, % | 96 |
| Perfect Whole Beads, % | 99 |
| Chatillon | 296 |

EXAMPLE 2 (COMPARATIVE)

A quaternary ammonium anion exchange resin, according to the prior art, is prepared as follows:

(a) A styrene-divinyl benzene copolymer, wherein the respective constituent monomers are mixed in the ratio 97.9:2.1, is prepared according to known suspension polymerization techniques.

(b) 106 parts of the copolymer of (a) is slurried in 296.9 parts ethylene dichloride (EDC) and 204.9 parts CME. In a separate flask, a solution of $AlCl_3$ and CME is prepared by slowly adding 83.2 parts $AlCl_3$ to 66.2 parts CME, with stirring and external cooling so as to maintain a temperature of less than 25° C. When dissolution of $AlCl_3$ is complete, the resultant solution is added dropwise to the copolymer slurry over a 4-hour period while maintaining the temperature in the range 35°–40° C. Upon completion of this addition, the chloromethylation reaction mixture is "held," i.e. stirred, for a further 4-hour period at 35°–40° C. Then, this reaction mixture is slowly poured into 589.7 parts tap water, with stirring, while maintaining the temperature at about 5° C., and the resulting intermediate copolymer bead slurry is stirred for about 0.5 hour. After allowing the beads to settle, the supernatant aqueous phase is siphoned off. These beads are washed by adding another 589 parts tap water to the beads, stirring the mixture for about 0.5 hour, allowing the beads to settle, and then siphoning off the supernatant aqueous phase. Another 589 parts tap water is added to the beads, the mixture stirred, and then the bead slurry neutralized by adding 50% NaOH. When the pH of this slurry is about 8.0, a further 300 parts tap water is added, and the resulting slurry is cooled to 0°–5° C.

(c) Quaternary ammonium anion exchange resin beads are prepared by adding 80.4 parts of anhydrous TMA to the cooled intermediate copolymer slurry from (b) over a 1.5-hour period. Upon completion of the addition of TMA, the stirred reaction mixture is heated under distillation conditions over a 3.5-hour period while adding tap water slowly so as to maintain the bead mixture as a slurry. Then, the reaction mixture is cooled to about 60° C. and the aqueous phase is siphoned off. The resin beads are collected on a filter pad and washed with three 1-liter portions of water. The product resin beads give the following analyses:

| Analytical Properties | |
|---|---|
| Moisture Holding Capacity, % | 53.4 |
| Weight Capacity, meq/gm | 4.10 |
| Whole Beads, % | 97 |

| Analytical Properties | |
|---|---|
| Chatillon | 25 |

EXAMPLE 3 (COMPARATIVE)

Another quaternary ammonium anion exchange resin, according to the prior art, is prepared as in Example 2 except that, in the step (b), the chloromethylation reaction mixture is poured into 310 parts of methanol and the intermediate copolymer beads are washed with about 200 parts methanol. The final methanol bead slurry is then neutralized, and the intermediate copolymer beads are subsequently aminated, as described in Example 2. The resulting product resin beads give the following analyses:

| Analytical Properties | |
|---|---|
| Moisture Holding Capacity, % | 55.9 |
| Weight Capacity, meq/gm | 4.22 |
| Whole Beads, % | 95 |
| Perfect Whole Beads, % | 99 |
| Chatillon | 317 |

EXAMPLE 4 (COMPARATIVE)

A quaternary ammonium anion exchange resin, according to the prior art, is prepared as in Example 2 except that, in step (a), a styrene-divinyl benzene-acrylonitrile terpolymer is prepared wherein the respective constituent monomers are mixed in the ratio 96.9:2.1:1. The physical data for the resulting resin is presented in Table I.

EXAMPLE 5 (COMPARATIVE)

A quaternary ammonium anion exchange resin is prepared according to the process of this invention except that, in step (a), a styrene-divinyl benzene copolymer is prepared wherein the respective constituent monomers are mixed in the ratio 97.9:2.1. The physical data for the resulting resin is presented in Table I.

EXAMPLE 6 (COMPARATIVE)

A quaternary ammonium anion exchange resin having a styrene-divinyl benzene (97.9:2.1) backbone is prepared as in Example 2 except that this material is prepared on typical plant production scale. The physical data for the resulting product resin is presented in Table I.

EXAMPLE 7 (COMPARATIVE)

Another quaternary ammonium anion exchange resin having a styrene-divinyl benzene (97.9:2.1) backbone is prepared by the process of Example 3 except that this material is prepared on typical plant production scale. The physical data for the resulting product resin is presented in Table I.

The results demonstrating that the combination of the polar functionally-substituted, monoethylenically unsaturated comonomer, acrylonitrile, and the use of CME in quantity in excess of that amount required in the chloromethylation reaction, step (b), are necessary for producing the enhanced physical stability of the resins according to this invention, are presented in Table I. It is observed that Example 1, according to this invention, gives greatly enhanced stability in the Chatillon stability test when compared to the results of Examples 4 to 7. It is further observed that, although Example 3 (above) and Example 7, which give what appear to be strikingly contrasting results, the average Chatillon stability values for a collection of preparations is 157.

In Tables I through VI, the following abbreviations are used:
MHC=Moisture Holding Capacity (%)
Qw=Weight Capacity (meq/g)
Chatillon Stability=The weight in grams required to crush 30 beads randomly selected from a sample of beads 20-30 mesh.
CME=Chloromethyl Methyl Ether
EDC=Ethylene Dichloride
WB=Whole Beads (%)
PWB=Perfect Whole Beads (%)

EXAMPLE 11

A resin, according to this invention, is prepared by the process of Example 1 except that the copolymer in step (a) is prepared from a monomer mixture of styrene-divinyl benzene-trimethylol propane trimethacrylate in the ratio 97:1:2. The physical data for this resin is presented in Table III.

EXAMPLE 12 (COMPARATIVE)

A resin having the composition of Example 11 is prepared according to the process described in Example 2 wherein the chloromethylation reaction, step (b), is run in CME/EDC solvent. The physical data for this resin is shown in Table III.

Table III demonstrates again the necessity for com-

TABLE I

Effect of Combination of Acrylonitrile in Copolymer and of Subsequent Chloromethylation in All Chloromethyl Methyl Ether on Quaternary Ammonium Anion Exchange Resins

| Ex. | Copolymer[a] | Chloromethyl-ation Conditions | Mol AlCl$_3$ Mol Copolymer | Type of Quench-Wash | MHC (%) | Qw | Chatillon Stability |
|---|---|---|---|---|---|---|---|
| 1 | S/DVB/AN[b] | CME | 0.60 | H$_2$O | 68.5 | 4.30 | 296 |
| 4 | S/DVB/AN[c] | CME/EDC | 0.60 | H$_2$O | 58.8 | 4.15 | 25 |
| 5 | S/DVB[c] | CME | 0.60 | H$_2$O | 67.0 | 4.37 | 25 |
| 6 | S/DVB[c] | CME/EDC | 0.60 | H$_2$O | 53.4 | 4.10 | 25 |
| 7 | S/DVB[c] | CME/EDC | 0.60 | CH$_3$OH | 55.9 | 4.22 | 150-200 (Avg.-157) |

[a]S/DVB/AN = 96.9% Styrene/2.1% Divinyl Benzene/1% Acrylonitrile
S/DVB = 96.9% Styrene/2.1% Divinyl Benzene
[b]Resin According to the invention.
[c]Comparative Resin.

EXAMPLES 8–10

Three resins are prepared according to this invention with the only difference being that the amount of AlCl$_3$ used as a catalyst in the chloromethylation reaction, step (b), is varied from 0.60, 0.70, and 0.80 mol per mol copolymer respectively. The physical data for these resins is shown in Table II. The difference in Chatillon values for Examples 1 and 8 is considered to reflect experimental variation.

bining the incorporation of a polar functionally-substituted, ethylenically unsaturated comonomer and the use of CME in quantity in excess of that amount required in the chloromethylation reaction, step (b), in order to obtain the enhanced physical stability according to this invention.

TABLE III

Effect of Combination of Trimethylol Propane Trimethacrylate in Copolymer and of Subsequent Chloromethylation in All Chloromethyl Methyl Ether on Quaternary Ammonium Anion Exchange Resins

| Ex. | Copolymer[a] | Chloromethyl-ation Conditions | Mol AlCl$_3$ Mol Copolymer | Type of Quench-Wash | MHC (%) | Qw | Chatillon Stability |
|---|---|---|---|---|---|---|---|
| 11 | S/DVB/TMPTMA[b] | CME | 0.60 | H$_2$O | 69.4 | 4.39 | 546 |
| 12 | S/DVB/TMPTMA[c] | CME/EDC | 0.60 | H$_2$O | 58.9 | 4.31 | 23 |

[a]S/DVB/TMPTMA = 97% Styrene/1% Divinyl Benzene/2% Trimethylol Propane Trimethacrylate
[b]Resin according to the invention.
[c]Comparative resin.

EXAMPLE 13

A resin is prepared according to Example 1 except that: (1) the copolymer in step (a) is prepared from a

TABLE II

Effect of Variation of AlCl$_3$ Amounts in Chloromethylation Reaction on MHC and Chatillon Stability of Quaternary Ammonium Anion Exchange Resins

| Ex. | Copolymer[a] | Chloromethyl-ation Conditions | Mol AlCl$_3$ Mol Copolymer | Type of Quench-Wash | MHC (%) | Qw | Chatillon Stability |
|---|---|---|---|---|---|---|---|
| 8 | S/DVB/AN | CME | 0.60 | H$_2$O | 68.5 | 4.30 | 120 |
| 9 | S/DVB/AN | CME | 0.70 | H$_2$O | 62.5 | 4.34 | 159 |
| 10 | S/DVB/AN | CME | 0.80 | H$_2$O | 57.3 | 4.51 | 425 |

[a]S/DVB/AN = 96.9% Styrene/2.1% Divinyl Benzene/1% Acrylonitrile monomer mixture of styrene-divinyl benzene-acrylonitrile in the ratio 95.9:2.1:2, and (2) 0.85 mol AlCl₃ per mol copolymer is used in the chloromethylation reaction, step (b). The physical data for this resin is presented in Table IV.

EXAMPLE 14

For comparative purposes, a quaternary ammonium anion exchange resin is prepared as follows:

(a) A styrene-divinyl benzene-acrylonitrile terpolymer is prepared as in Example 1(a) wherein the constituents of the monomer mixture are combined in a 96.9:2.1:1 ratio;

(b) The terpolymer from (a) is then chloromethylated as in Example 1(b) except that 0.85 mol AlCl₃ per mol copolymer is used and the reaction is quenched, and the intermediate copolymer is washed and slurried, with methanol;

(c) A resin is then prepared as in Example 3(c) by treating the methanolic slurry of the intermediate copolymer with anhydrous trimethylamine. The physical data for this resin is presented in Table IV.

EXAMPLE 15

For comparative purposes, another quaternary ammonium anion exchange resin is prepared according to Example 14 except that the copolymer in step (a) is prepared from a monomer mixture of styrene-divinyl benzene-acrylonitrile in the ratio 95.9:2.1:2. The physical data for this resin is presented in Table IV.

Table IV shows the effects of increasing the amount of polar functionally-substituted comonomer and of the use of methanol quench compared with water quench. It is observed that the use of methanol quench produces particularly high physically stable resin beads. However, as mentioned hereinbefore, the use of methanol involves complex and expensive manufacturing apparatus and manipulations which detract from the advantages of the use of this solvent.

TABLE IV

Effect of Increased Amount of Polar Functionally-Substituted Comonomer and Use of Methanol quench

| Example[a] | Type of Quench | % MHC | Qw | Chatillon Stability |
|---|---|---|---|---|
| 13[b] | H₂O | 53.5 | 4.21 | 335 |
| 14[c] | CH₃OH | 52.8 | 4.00 | 476 |
| 15[c] | CH₃OH | 58.7 | 4.62 | 702.9 |

[a]Examples 13-15 are prepared by the process wherein the chloromethylation reaction, step (b), involves the use of CME in the presence of 0.85 mol AlCl₃ per mol copolymer.
[b]Resin according to the invention.
[c]Comparative resin.

EXAMPLES 16-18 (COMPARATIVE)

Three quaternary ammonium anion exchange resins are prepared according to the process of this invention described in Example 1 except that in each of Examples 16-18, in step (a), a styrene-divinyl benzene copolymer is prepared wherein the respective constituent monomers are present in the ratio of parts by weight of 96.2:3.8. The physical data for the resulting resins are presented in Table V.

EXAMPLES 19-24

Six quaternary ammonium anion exchange resins are prepared according to the invention by the process described in Example 1 wherein, in step (a), each of the initial copolymers in Examples 19-24 is prepared from a monomer system of styrene-divinyl benzene-acrylonitrile in the ratio of parts by weight of about 94.2:3.8:2. The physical data for these resins are presented in Table V.

TABLE V

Comparison of the Effect on Physical Properties of Quaternary Ammonium Anion Exchange Resins Prepared from Copolymers With and Without Incorporation of Acrylonitrile

| Ex. | AN Level, % | Chatillon Stability | WB, % | PWB, % | MHC, % | Qw |
|---|---|---|---|---|---|---|
| 16 | 0 | —[a] | 95 | 29 | —[a] | —[a] |
| 17 | 0 | —[a] | 97 | 32.5 | 52.6 | 4.52 |
| 18 | 0 | —[a] | 95 | 36 | 52.1 | 4.52 |
| 19 | 2 | 452 | 98 | 98 | 51.3 | 4.30 |
| 20 | 2 | 501 | 100 | 96 | 52.0 | 4.15 |
| 21 | 2 | 752 | 100 | 99 | 50.7 | 4.32 |
| 22 | 2 | 742 | 100 | 93 | 51.5 | 4.30 |
| 23 | 2 | 537 | 100 | 98 | 52.5 | 4.26 |
| 24 | 2 | 684 | 100 | 100 | 50.27 | 4.31 |

[a]Data not collected

The results presented in Table V demonstrates the unexpected, synergistic effects of combining (1) the incorporation of acrylonitrile and (2) of haloalkylating the starting copolymer, quenching the haloalkylation reaction, and aminolyzing the haloalkylated intermediate copolymer in the absence of added organic solvent. Although chatillon stability data was not collected for Examples 16-18, comparison of the percent of whole beads obtained with the percent of perfect whole beads obtained shows the percent of perfect whole beads to be in the range of about sixty (60) percent less than the percent perfect beads. When acrylonitrile is incorporated into the initial copolymer backbone, as in Examples 19-24, the percent perfect whole beads obtained is virtually the same as the percent perfect beads obtained. Additionally, in Example 19-24 wherein acrylonitrile is incorporated into the initial copolymer backbone, the high chatillon stability values observed in previous Examples according to the invention are also here observed.

EXAMPLES 25-29

A set of five (5) pairs of quaternary ammonium anion exchange resins is prepared wherein each member is prepared from a copolymer polymerized from a monomer system having the general composition.

Styrene/Divinyl Benzene/"Polar Comonomer" (94/4/2) The "control" resin is prepared according to the process set forth in Example 6 and contains additional styrene in the place of "polar comonomer." The specific composition of each resin (including the definition of the "Polar Comonomer" in each pair of resins), the process by which each resin is prepared (i.e. according to the invention as set forth in Example 1, or according to the prior art as set forth in Exaple 2), and the physical properties of the resins are set forth in Table VI.

Table VI

Side-by-side Comparison of the Effect on Physical Properties of Quaternary Ammonium Anion Exchange Resins Prepared From Copolymers Containing Units from Polar Comonomers in the Absence and in the Presence of Added Organic Solvent

| Ex. | Polar Comonomer | Process | MHC (%) | Qw | PB | Chatillon Stability |
|---|---|---|---|---|---|---|
| 25 (a) | MA | Expl. 1 | 65.3 | 4.39 | 5 | 25 |
| 25 (b) | MA | Expl. 2 | 55.4 | 4.22 | 0 | 25 |

Table VI-continued

Side-by-side Comparison of the Effect on Physical Properties of Quaternary Ammonium Anion Exchange Resins Prepared From Copolymers Containing Units from Polar Comonomers in the Absence and in the Presence of Added Organic Solvent

| Ex. | Polar Comonomer | Process | MHC (%) | Qw | PB | Chatillon Stability |
|---|---|---|---|---|---|---|
| 26 (a) | EHA | Expl. 1 | 63.6 | 4.2 | 30 | 25 |
| 26 (b) | EHA | Expl. 2 | 53.9 | 4.1 | 0 | 25 |
| 27 (a) | MMA | Expl. 1 | 64.6 | 4.4 | 98 | 131 |
| 27 (b) | MMA | Expl. 2 | 54.9 | 4.22 | 0 | 25 |
| 28 (a) | AN | Expl. 1 | 64.0 | 4.3 | 93 | 296 |
| 28 (b) | AN | Expl. 2 | 56.6 | 4.17 | 0 | 25 |
| 29 (a) | IDMA | Expl. 1 | 64.6 | 2.0 | 98 | 127 |
| 29 (b) | IDMA | Expl. 2 | 55.3 | 2.4 | 0 | 0 |
| 5 | None | Expl. 5 | 67.0 | 4.37 | — | 25 |
| 6 | None | Expl. 6 | 53.4 | 4.10 | — | 25 |

The results set forth in Table VI demonstrate the unexpected advantages of the invention in a side-by-side comparison of resins prepared by the process of the invention and by a process according to the prior art. When a quaternary ammonium anion exchange resin is prepared according to the prior art without incorporating a unit from a polar comonomer in the copolymer backbone but in the absence of added organic solvent (Example 5), this resin shows no significant improvement in Chatillon stability when compared to a resin prepared according to the prior art without incorporating a unit from a polar comonomer in the polymer backbone but in the presence of added organic solvent (Example 6). The second examples, designated "(b)", of each of the pairs Examples 25-29 show that no significant improvement in Chatillon stability is achieved when a unit from a polar comonomer is incorporated in the polymer backbone of a resin prepared by the prior art process employing added organic solvent. However, when, as shown in the first examples, designated "(a)", of each of the pairs Examples 25-29, the incorporation of a unit from a polar comonomer in the polymer backbone is combined with carrying out the preparation of the quaternary anion exchange resin in the absence of added organic solvent, a resin characterized by highly significant improved Chatillon stability is obtained when the polar comonomer is methyl methacrylate, acrylonitrile and isodecyl methacrylate. Further, it is considered significant that in each of Examples 25-29, (a), according to the invention, a substantial, if not major, proportion of the beads obtained are "perfect beads" whereas, in Examples 25-29, (b), according to the prior art, none of the beads obtained are determined to be "perfect beads."

Chatillon Test

The Chatillon test, or Chatillon friability determination, is a test developed to measure the force necessary to break a single bead of ion exchange resin. The results of this test are taken in the art to be an indication, i.e. a measure, of the physical strength of the bead and, hence, its ability to resist physical attrition during its use in high stress ion exchange operations. In this test, a single whole wet resin bead is randomly selected and placed in the center of the bottom plane of a Chatillon Scale Model DPP-5. The bottom plane is then slowly further advanced until the force gauge is activated whereupon the gauge indicator moves in a clockwise direction. The bottom plane is further advanced until the indicator moves in a counterclockwise motion, which change in motion indicates that the bead is breaking. The highest clockwise reading is recorded as the force necessary to break the bead. The average result of the test of 30 beads is calculated, and this result is reported as the "Chatillon stability" or the "friability" of the resin beads.

What is claimed is:

1. A process for preparing an anion exchange resin comprising the steps of:
   (a) preparing a crosslinked copolymer by polymerizing a monomer system comprising (i) from about 85 to 99.95 parts by weight of at least one non-polar, aromatic monovinyl hydrocarbon monomer selected from the class consisting of styrene, o-, m, and p-alkylstyrenes, o-, m-, and p-alkoxystyrenes, and vinyl naphthalene, (ii) from about 5 to 0.05 parts by weight of at least one polar functionally-substituted comonomer selected from the group consisting of methyl methacrylate, trimethylol propane trimethacrylate, acrylonitrile and isodecyl methacrylate; and (iii) from about 10 to 0 parts by weight of at least one polyvinyl aromatic hydrocarbon selected from the class consisting of divinyl benzene, divinyl alkyl benzenes, divinyl naphthalenes and trivinyl benzene;
   (b) haloalkylating said copolymer in the presence of a Lewis acid catalyst wherein the haloalkylating agent is present in an excess quantity and is selected from the group consisting of mono-chloromethyl methyl ether and bis-chloromethyl ether;
   (c) quenching the haloalkylation reaction, and washing the haloalkylated intermediate copolymer, with water;
   (d) treating said intermediate copolymer in an aqueous slurry with a tertiary amine to give a quaternary anion exchange resin; and
   (e) Carrying out steps (a) through (d) in the absence of added organic solvent whereby an anion exchange resin characterized by improved physical stability is obtained.

2. The process of claim 1 wherein the copolymer is prepared from a monomer system comprising:
   (a) from about 90 to 97.5 parts by weight of at least one aromatic, monovinyl hydrocarbon monomer selected from the group consisting of styrene and o-, m-, and p-alkylstyrenes;
   (b) from about 2.5 to 0.5 parts by weight of at least one polar functionally-substituted comonomer selected from the group consisting of acrylonitrile, methyl methacrylate, iso-decyl methacrylate, and trimethylol propane trimethacrylate; and
   (c) from about 7.5 to 1.8 parts by weight of divinyl benzene.

3. The process of claim 2 wherein the tertiary amine is trimethylamine.

4. A product prepared by the process of claim 1.

5. A product prepared by the process of claim 3.

6. The product of claim 5 wherein the copolymer is a styrene-divinyl benzene-acrylonitrile terpolymer.

7. The product of claim 5 wherein the copolymer is a styrene-divinyl benzene-trimethylol propane trimethacrylate terpolymer.

8. The product of claim 5 wherein the copolymer is a styrene-divinyl benzene-methyl methacrylate terpolymer.

9. The product of claim 5 wherein the copolymer is a styrene-divinyl benzene-iso-decyl methacrylate terpolymer.

* * * * *